United States Patent
Lee et al.

(10) Patent No.: US 7,284,455 B2
(45) Date of Patent: Oct. 23, 2007

(54) ELECTRONIC ENVIRONMENT SENSING INSTRUMENT HAVING AN ANALOG INDICATOR

(75) Inventors: Ping-Han Lee, Taipei (TW); Li-Zhen Wang, Anyang (CN)

(73) Assignee: Matador International Inc. (TW)

( * ) Notice: Subject to any disclaimer, the term of this patent is extended or adjusted under 35 U.S.C. 154(b) by 239 days.

(21) Appl. No.: 11/108,675

(22) Filed: Apr. 19, 2005

(65) Prior Publication Data

US 2006/0232401 A1 Oct. 19, 2006

(51) Int. Cl.
*G01D 11/24* (2006.01)
*G06M 1/06* (2006.01)
*G01F 15/06* (2006.01)
*B27D 5/22* (2006.01)

(52) U.S. Cl. .................. 73/866.1; 73/431; 73/273; 235/94 A; 235/94 R; 235/103

(58) Field of Classification Search .......... 73/866.1, 73/431, 272 R, 273–281, 272 A; 23/94 A, 23/94 R, 103
See application file for complete search history.

(56) References Cited

U.S. PATENT DOCUMENTS

| | | | | | |
|---|---|---|---|---|---|
| 3,720,106 | A | * | 3/1973 | Varga ..................... | 73/273 |
| 4,020,689 | A | * | 5/1977 | Onoda et al. ............ | 73/272 R |
| 4,080,827 | A | * | 3/1978 | Esola ..................... | 73/275 |
| 4,245,504 | A | * | 1/1981 | Albrecht ................. | 73/275 |
| 4,489,600 | A | * | 12/1984 | Han ..................... | 73/275 |
| 4,565,090 | A | * | 1/1986 | Gotanda ................. | 73/198 |
| 5,305,647 | A | * | 4/1994 | Atkinson ............... | 73/861.01 |
| 5,476,731 | A | * | 12/1995 | Karsten et al. ........ | 429/97 |
| 5,631,419 | A | * | 5/1997 | Fruitman et al. ...... | 73/431 |
| 5,703,290 | A | * | 12/1997 | Karur et al. ........... | 73/430 |
| 5,744,714 | A | * | 4/1998 | Walding et al. ....... | 73/431 |
| 5,877,703 | A | * | 3/1999 | Bloss et al. .......... | 340/870.02 |
| 6,100,816 | A | * | 8/2000 | Moore .................. | 340/870.02 |
| 6,502,468 | B1 | * | 1/2003 | Thornborough ....... | 73/861.78 |
| 6,918,311 | B2 | * | 7/2005 | Nathan ................. | 73/866.1 |
| 2003/0151886 | A1 | * | 8/2003 | Buhl ..................... | 361/600 |
| 2004/0023638 | A1 | * | 2/2004 | Reading ................ | 455/405 |
| 2006/0226825 | A1 | * | 10/2006 | Gebler et al. ......... | 324/115 |

FOREIGN PATENT DOCUMENTS

FR 2196731 A * 4/1974
WO WO 9401741 A1 * 1/1994

* cited by examiner

*Primary Examiner*—Hezron Williams
*Assistant Examiner*—David A. Rogers
(74) *Attorney, Agent, or Firm*—Hershkovitz & Associates; Abe Hershkovitz

(57) ABSTRACT

An electronic environment sensing instrument having an analog indicator has a casing having a front panel with a scale, an electronic sensing and driving assembly mounted in the casing, a needle and a DC power supply. The electronic driving indicator assembly has a detecting and driving circuit to sense and measure an environmental parameter outside the casing and generates a control signal, a drive unit to receive the control signal and rotate a specific amount in a specific direction based on the control signal and a gear assembly connected to and driven by the drive unit. The needle is attached to and driven by the gear assembly and points to a specific value on the scale corresponding to the sensed environmental parameter.

22 Claims, 9 Drawing Sheets

ELECTRONIC ENVIRONMENT SENSING INSTRUMENT HAVING AN ANALOG INDICATOR

BACKGROUND OF THE INVENTION

1. Field of the Invention

The present invention relates to an electronic environment sensing instrument and more particularly to an electronic environment sensing instrument having an analog indicator that points to a specific point on a scale corresponding to a sensed environmental parameter such as temperature, humidity or the like.

2. Description of Related Art

Two types of conventional environmental sensing instruments are available in the market and include thermometers, hygrometer, anemometers and the like. One is a mechanical instrument, and the other is an electronic instrument. The mechanical instrument has an analog indicator that indicates the current reading and can drive indicators to mark high and low readings for a given period. The digital instrument provides a precise digital readout of the current reading.

With reference to FIG. 9, a conventional mechanical thermometer has a panel (90), a Borden tube assembly (70) and an indicator set (80).

The panel (90) has a front face (not numbered), a scale (not numbered) a through hole (91) and optional high and low indicators (not shown). The scale is on the front face (not numbered), is printed or etched and is a temperature scale, a relative humidity scale or the like. The high and low indicators are pivotally attached to the front face of the panel (90) and respectively indicate high and low readings on the scale.

The Borden tube assembly (70) has a base (71), a copper C-ring (72) and a transmission shaft (73). The base (71) has a front surface (not numbered) and a pivot hole (711). The hole (711) is defined in the front surface of the base (71). The copper C-ring (72) has a proximal end (not numbered) and a distal end (not numbered), is connected to the base (71) and expands or contracts depending on the temperature. The transmission shaft (73) is connected to distal end of the copper ring (72) and has an L-shaped distal end (731).

The indicator (80) is L-shaped and has a shaft (81), a needle (82) and a connector (83). The shaft (81) is mounted through the through hole (91) in the panel (90), rotatably mounted in the hole (711) in the base (71) and has a distal end (not numbered). The distal end protrudes through the through hole (91) in the panel (90). The needle (82) is connected to the distal end of the shaft (81), pivots the high and low indicators on the front face of the panel (90) and indicates the current temperature on the scale on the panel (90). The connector (83) is attached to the shaft (81) and has a mounting hole (831). The mounting hole (831) rotatably holds the L-shaped distal end (731) of the transmission shaft (73) that rotates the shaft (81) in the pivot hole (711) in the base (71) to indicate the current temperature on the scale on the panel (90) when the copper C-ring (72) expands or contracts.

Because the specific current environmental parameter has to be interpolated from the scale on the panel (90) of the device, electronic instruments were designed to provide a precise digital readout of the current sensed environmental parameter. Even though the electronic instruments provide precise instantaneous readings of the current environmental parameter, the electronic environment sensing instrument cannot provide high and low readings without a significant increase in the electronics or the software.

Therefore, the present invention provides an electronic environment sensing instrument that has an analog indicator to obviate or mitigate the problems with conventional mechanical and electronic environment sensing instruments.

SUMMARY OF THE INVENTION

The main objective of the present invention is to provide an electronic environment sensing instrument having an analog indicator. The electronic environment sensing instrument precisely senses an instantaneous environmental parameter such as temperature, humidity or the like and points an indicator to the exact value of the instantaneous environmental parameter on a scale on a panel.

The electronic environment sensing instrument has a casing, an electronic sensing and driving assembly, a needle and a DC power supply. The casing has a front panel with a scale. The electronic sensing and driving assembly is mounted in the casing and has a sensing and driving circuit, a drive unit and a gear assembly, a needle and a DC power. The detecting and driving circuit senses and measures an environmental parameter outside the casing and generates a control signal. The drive unit receives the control signal from the detecting and driving circuit and rotates a specific amount in a specific direction based on the control signal. The gear assembly is connected to and driven by the drive unit. The needle is attached to and driven by the gear assembly and points to a specific value on the scale on the front panel of the casing corresponding to the sensed and measured environmental parameter. The DC power supply is mounted in the casing and is attached to the electronic sensing and driving assembly.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
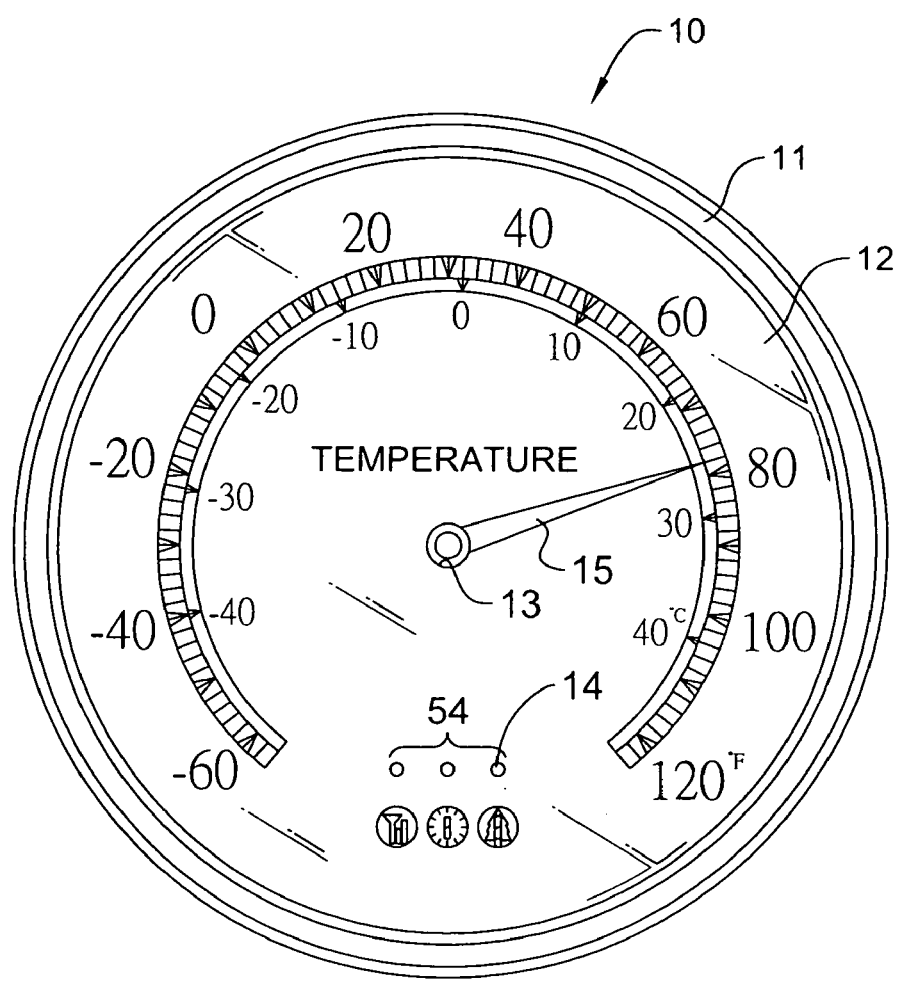
FIG. 1 is a front view of an embodiment of an electronic environment sensing instrument having an analog indicator in accordance with the present invention implemented as a thermometer.
Figure 2:
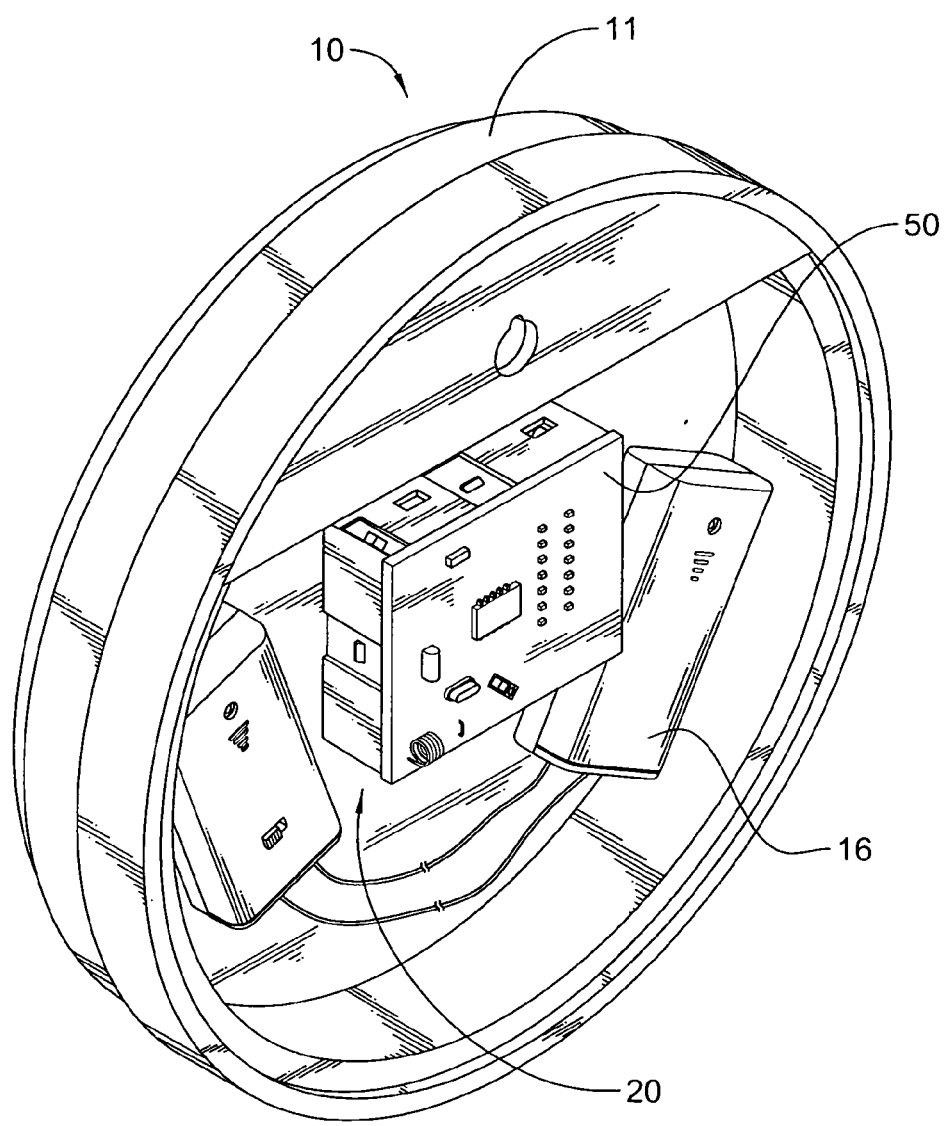
FIG. 2 is a perspective rear view of the electronic environment sensing instrument in FIG. 1.
Figure 8:
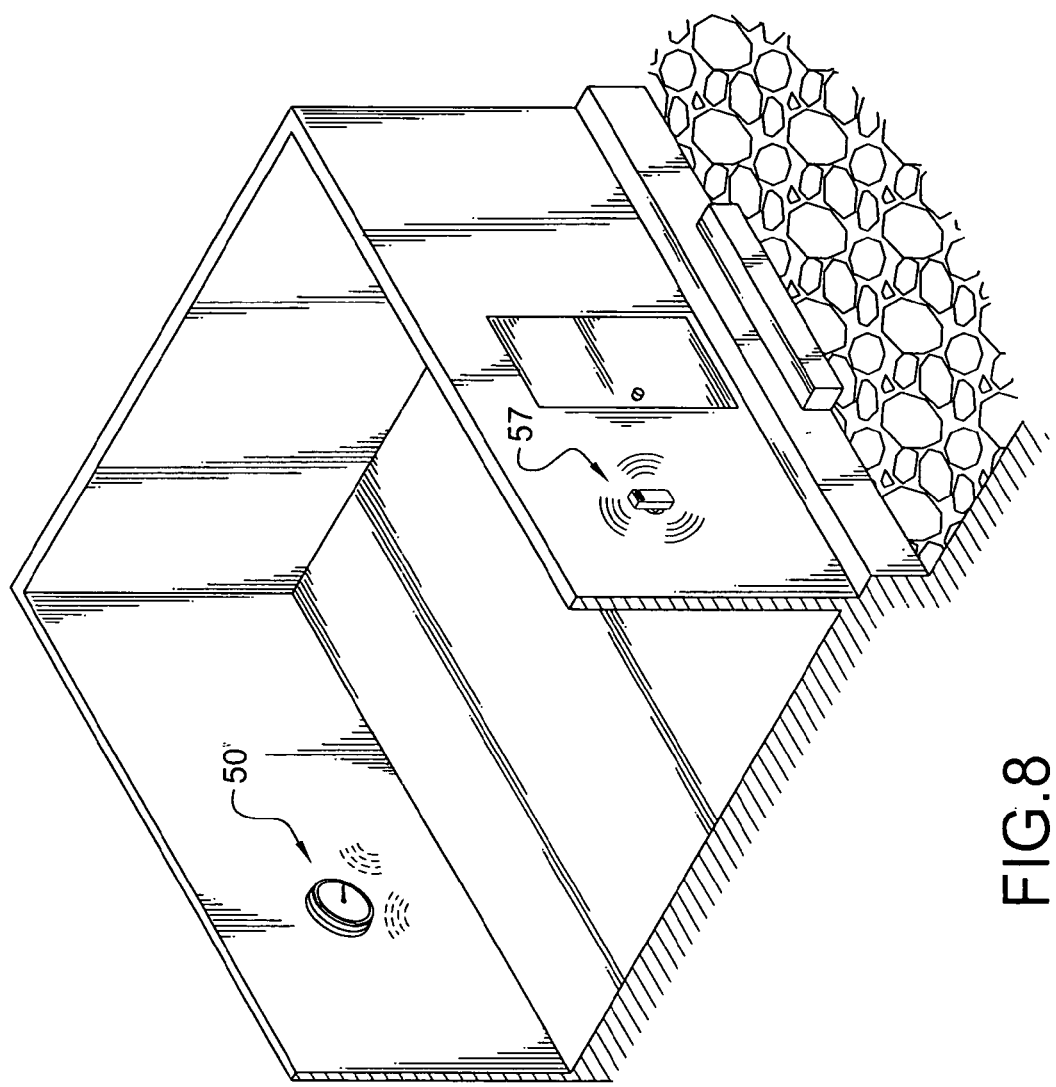
FIG. 8 is an operational perspective view of a second embodiment of an electronic environment sensing instrument having an analog indicator in accordance with the present invention.
Figure 9:
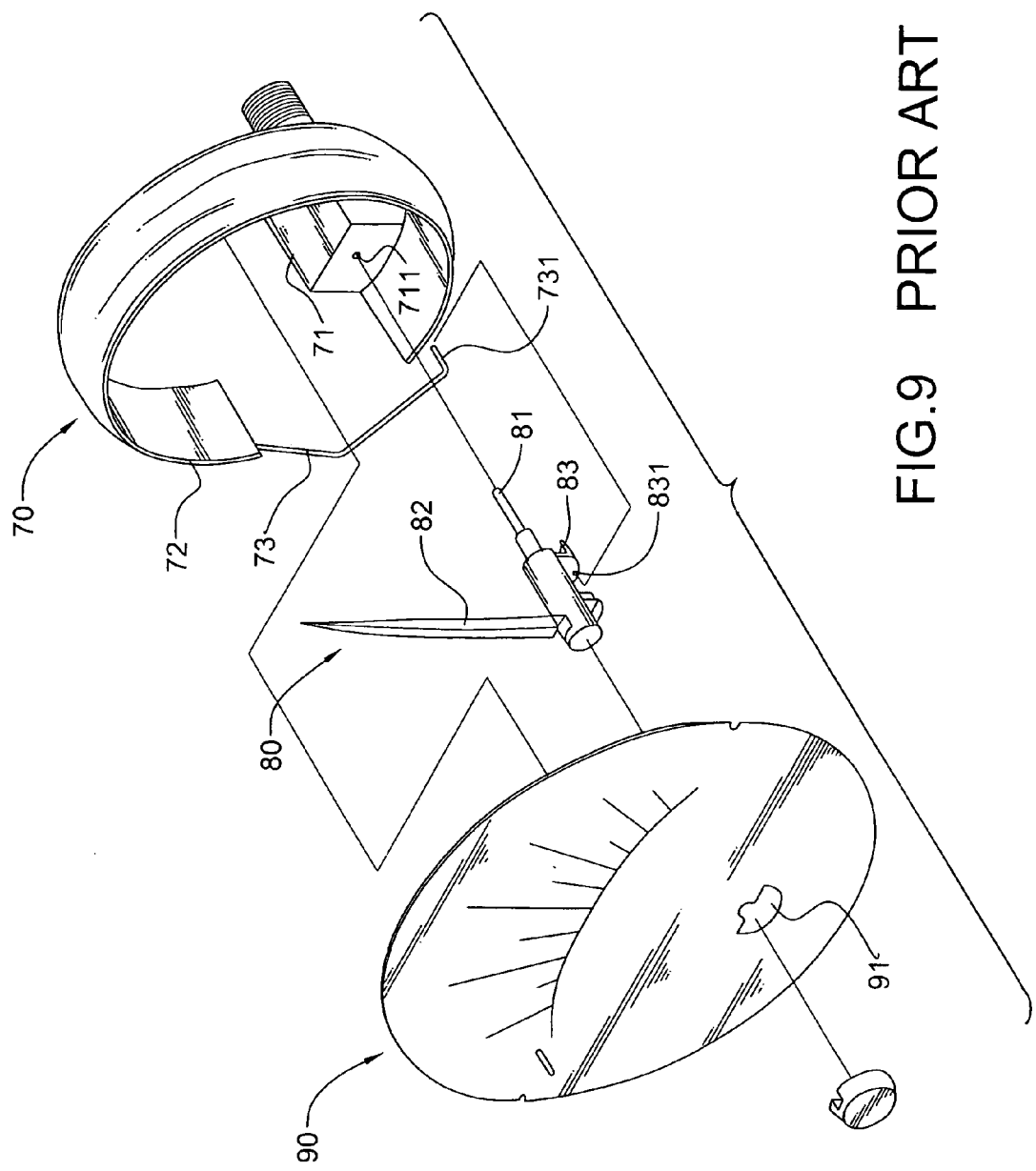
FIG. 9 is an exploded perspective view of a conventional mechanical thermometer in accordance with the prior art.

With reference to FIGS. 1, 2 and 8, an electronic environment sensing instrument (10) in accordance of the present invention has a casing (11), an electronic sensing and driving assembly (20), a needle (15) and a DC power supply (16).

The casing (11) has a front panel (12). The front panel (12) has a front face, a rear face, a central through hole (13) and optional multiple indicator holes (14). The front face has at least one scale corresponding to a sensed and measured environmental parameter.

Figure 3:
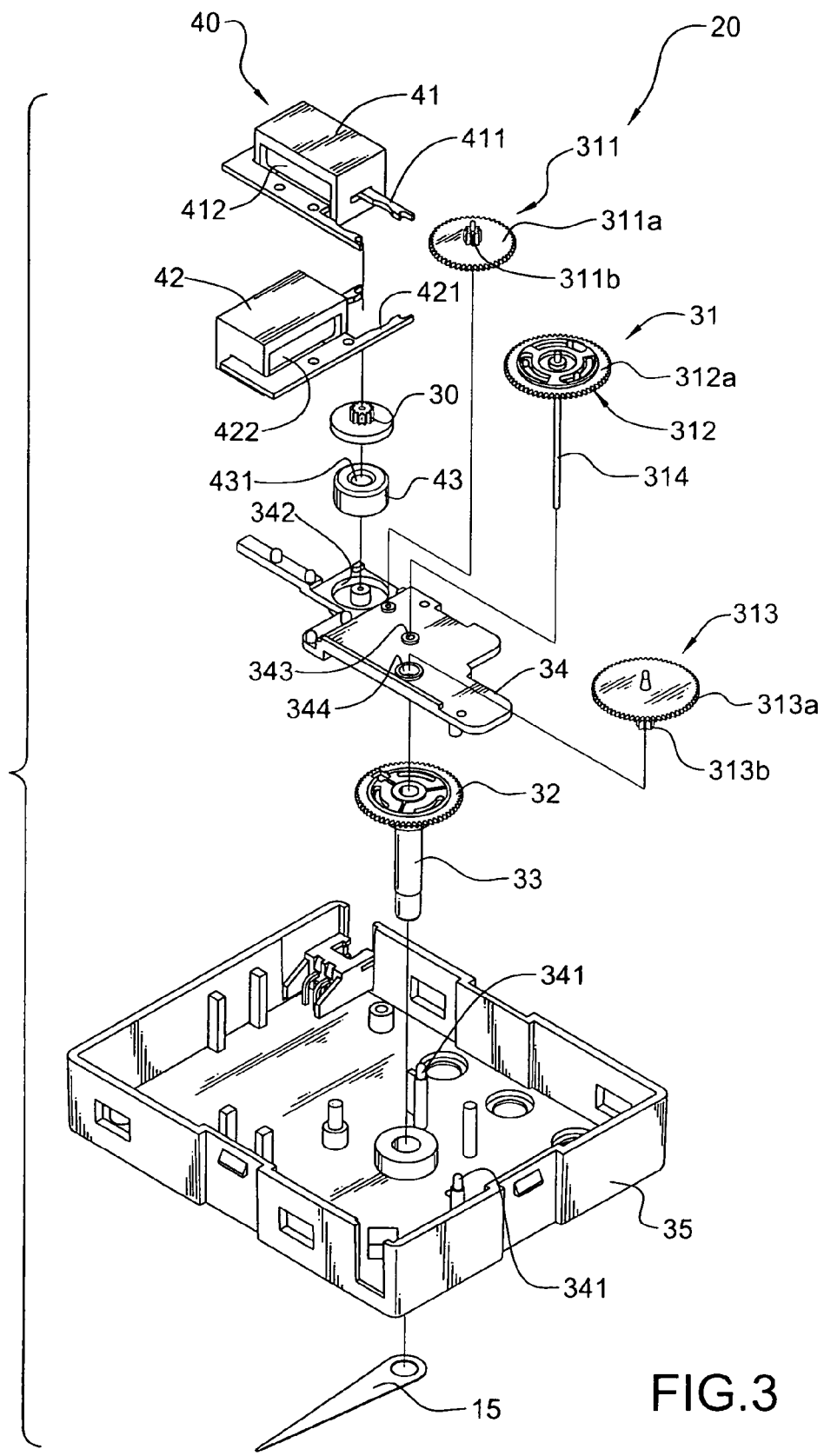
FIG. 3 is an exploded perspective view of an electronic driving assembly in an electronic sensing and driving assembly in the electronic environment sensing instrument in FIG. 2.

With further reference to FIG. 3, the electronic sensing and driving assembly (20) is attached to the rear face of the front panel (12) and has a detecting and driving circuit (50), a drive unit (40), a gear assembly, an optional driving assembly casing (35) and an optional remote sensing unit (57). In a first embodiment of the electronic environment sensing instrument (10), the entire electronic sensing and driving assembly (20) is attached to the rear face of the casing (11). In a second embodiment of the electronic environment sensing instrument (10), sensing elements of the electronic sensing and driving assembly (20) are mounted remotely from the casing (11) and communicate with wireless elements.

Figure 4:
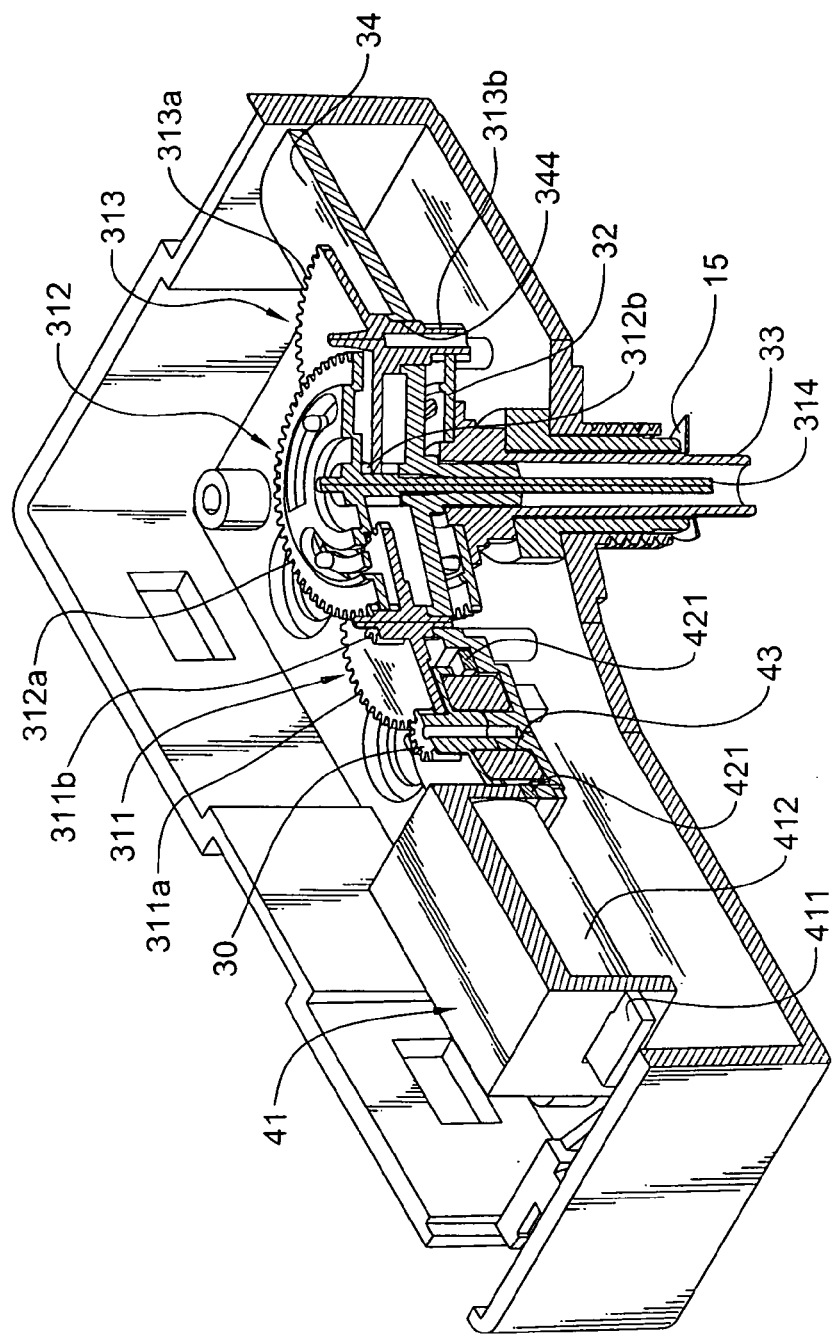
FIG. 4 is a cross sectional perspective view of the electronic driving assembly in FIG. 3.
Figure 5:
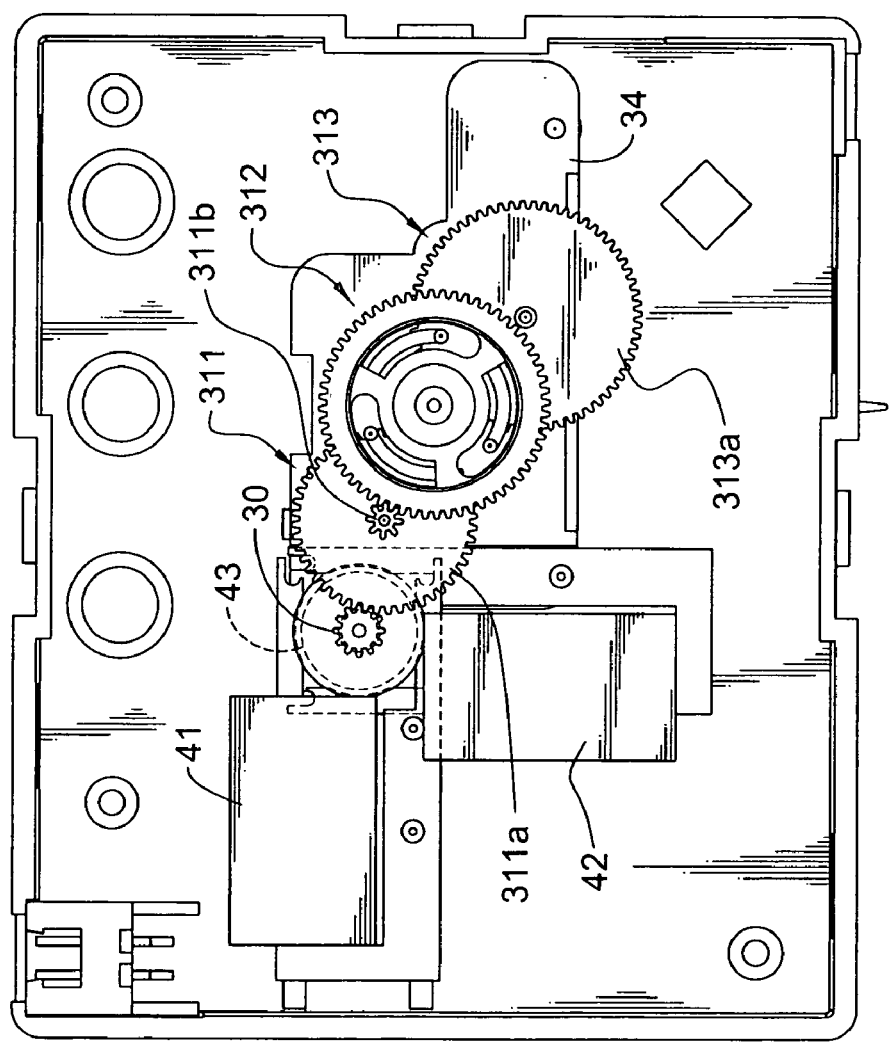
FIG. 5 is a top view of the electronic driving assembly in FIG. 3.

With reference to FIGS. 3, 4 and 5, the gear assembly has a main gear (30), a decelerating gear set (31), a linking gear (32) and a connector (33).

The main gear (30) is connected to the drive unit (40). The drive unit (40) rotates the main gear (30). The decelerating gear set (31) has multiple gear elements (311~313), each of which has a small drive gear (311b~313b) and a large driven gear (311a~313a). The linking gear (32) has a central axis and a central hole defined coaxially in the linking gear (32).

In the first embodiment, the decelerating gear set (31) has a first gear element (311), a second gear element (312) and a third element (313). The large driven gear (311a) of the first gear element (311) engages the main gear (30), and the small drive gear (311b) engages the large driven gear (312b) of the second gear element (312). The small drive gear (312a) of the second gear element (312) engages the large driven gear (313a) of the third gear element (313). The small drive gear (313b) of the third gear element (313) engages the linking gear (32). The center axis of the linking gear (32) is connected to the connector (33). With further reference to FIG. 1, the connector (33) is mounted in the through hole (13) in the casing (11) to hold the needle (15) outside the front face. Based on the connection of the main gear (30), the decelerating gear set (31), the linking gear (32), the connector (33) and the needle (15), the needle (15) will be precisely rotated in small increments when the main gear (30) is driven by the drive unit (40).

The drive unit (40) has a clockwise winding (41), a counterclockwise winding (42) and a ring magnet (43). The clockwise winding (41) and counterclockwise winding (42) are mounted on the rear face perpendicular to each another. Each winding (41, 42) has a U-shaped yoke (411, 421) and a coil (412, 422) wound around the yoke (411, 421). Each yoke (411, 421) has an opening and two opposite arms. The coils (412, 422) are wound around one arm respectively of the yokes (411, 421) and are connected to the detecting and driving circuit (50). The openings of the yokes (411, 421) respectively on the clockwise winding (41) and counter-clockwise winding (42) are perpendicular to each another. The ring magnet (43) is mounted rotatably in the two openings and attached securely to the main gear (30). When the detecting and driving circuit (50) outputs a voltage to one of the coils (412, 422), a magnetic field is generated in the corresponding yoke (411, 421) to rotate the ring magnet (43). When the voltage is input to the coil (412) of the clockwise winding (41), the ring magnet (43) is rotated clockwise. If the ring magnet (43) rotates counterclockwise, the will be input to the coil (422) of the counterclockwise winding (42). Therefore, the rotating direction of the needle (15) is controlled by the detecting and driving circuit (50).

Further, to minimize space required for the gear assembly and the drive unit (40), a board (34) is mounted on the rear face of the of the front panel (12) and corresponds to the central through hole (13) in the front panel (12). The board (34) is mounted on multiple posts (341) formed on the rear face, so a gap is formed between the rear face and the board (34). The board (34) has an upper face, a magnet recess (342), a pin hole (343) and at least one drive gear hole (344). The magnet recess (342) is formed on the upper face of the board (34) and rotatably holds the ring magnet (43). The pin hole (343) is formed through the board (34) and corresponds to the central through hole (13) in the front panel (12). At least one drive gear hole (344) is defined through the board (34) to allow the main gear (30) or a small drive gear (311b, 312b, 313b) to extend through the board (34) and engage a corresponding large driven gear (311a, 312a, 313a) or the linking gear (32). Since the main gear (30) is connected to the ring magnet (43), the decelerating gear set (31) is mounted on the upper face of the board (34), and the linking gear (32) is mounted under the board (34). To allow the third gear element (3 13) to engage the linking gear (32), the small drive gear (313b) passes through the drive gear hole (344) and engages the linking gear (32) under the board (34). The second gear element (312) further has a pin (314) coaxially lo mounted in the small drive gear (312b). The pin (314) is mounted rotatably in the pin hole (343).

To implement the electronic sensing and driving assembly (20) as a module, a driving assembly casing (35) can be added to hold the electronic sensing and driving assembly (20). The driving assembly casing (35) is directly attached to the rear face of the casing (11).

Figure 6:
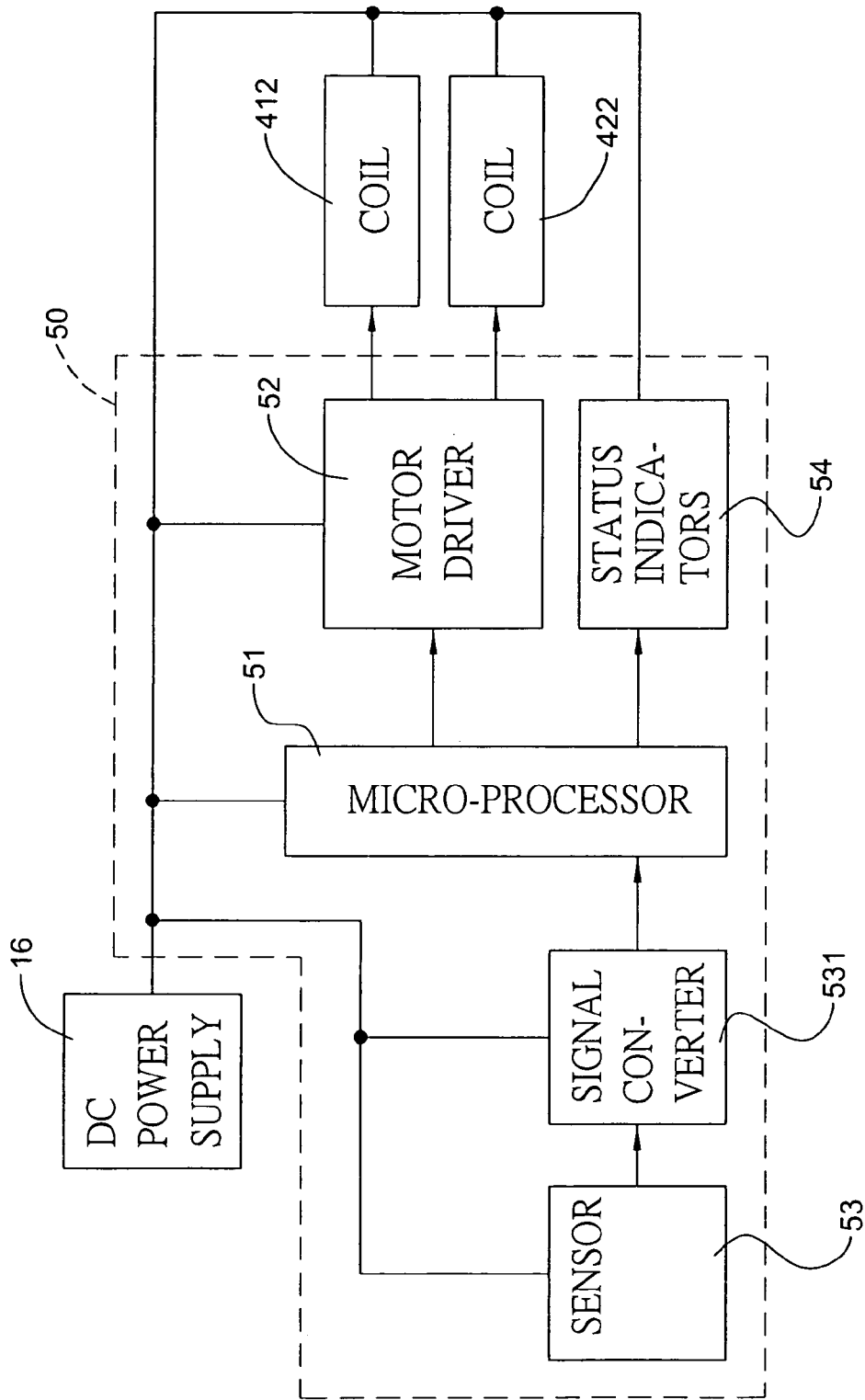
FIG. 6 is a functional block diagram of a first embodiment of a sensing and driving circuit in the sensing and driving assembly in FIG. 2.

With further reference to FIG. 6, a first embodiment of the detecting and driving circuit (50) has a microprocessor (51), a sensor (53), a signal converter (531), a motor driver (52) and an optional status indicator (54). The microprocessor (51) calculates a value for a sensed environmental parameter, generates a control signal and has multiple inputs and outputs. The sensor (53) can be a temperature sensor, humidity sensor or the like, senses and measures an appropriate environmental parameter, such as temperature, humidity or the like, outside the casing (11), is connected to the inputs of the microprocessor (5 1) through the signal converter (531) and sends a sensed signal to microprocessor (51). The signal converter (531) is connected to an input of the microprocessor (51), can be an analog to digital converter, receives a sensed parameter from the sensor (53), converts the sensed parameter and sends the converted sensed parameter to the microprocessor (51). The motor driver (52) is connected to an output of the microprocessor (51), receives a control signal from the microprocessor (51) and sends a corresponding voltage to the appropriate winding (41, 42) to rotate the needle (15) to the correct value on the scale on the front panel (12). The status indicators (54) are connected to outputs of the microprocessor (51) and indicate the status of selected elements. The status indicator (54) can be an LED set or a LCD. The status indicator (54) may be an LED set having three different color LED elements. Each LED element is mounted in a corresponding indicator hole (14) on the front face of the front panel (12). The front face of front panel (12) may have different symbols for various parameters such as battery voltage, signal searching, etc. The symbols correspond respectively to the LED elements.

Figure 7:
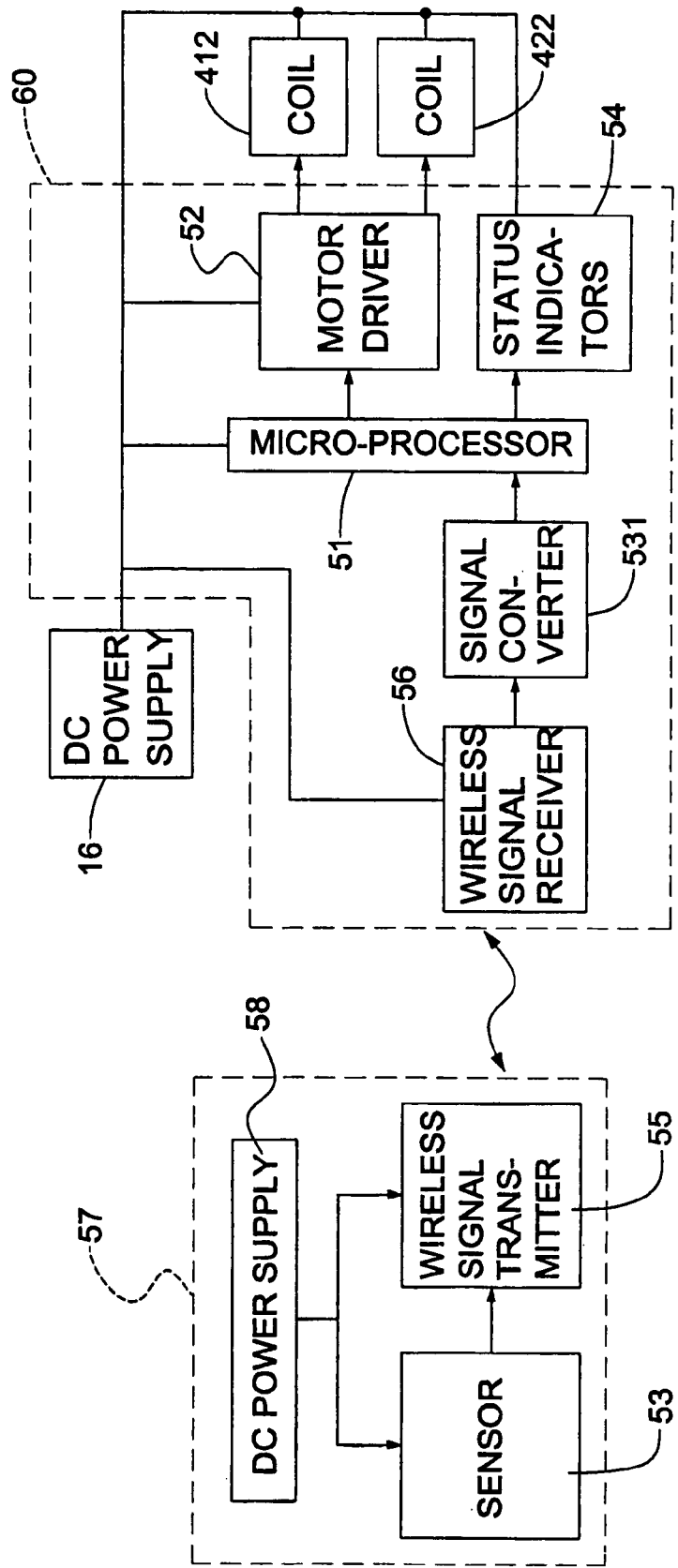
FIG. 7 is a functional block diagram of a second embodiment of a sensing and driving circuit in the sensing and driving assembly in accordance with the present invention.

With reference to FIG. 7, a second embodiment of the detecting and driving circuit in accordance with the present invention has a wireless detector (57) and a controller (60). The wireless detector (57) has a sensor (53), a wireless signal transmitter (55) and a DC power supply (58). The sensor (53) detects the instantaneous environmental parameter and generates a detection signal and sends the detection signal to the wireless signal transmitter (55). The wireless signal transmitter (55) connected to the sensor (53), receives the detection signal from the sensor (53), converts the detection signal to a wireless detection signal and transmits the wireless detection signal.

The controller (60) has a microprocessor (51), a wireless signal receiver (56), a motor driver (52) and an optional status indicator (54).

The wireless signal receiver (56) is connected to an input of the microprocessor (51), receives the wireless detection signal transmitted by the wireless signal transmitter (55) and outputs the detection signal to the microprocessor (51). Therefore, the wireless detector (58) is separated from the detecting and driving circuit to implement to an independent sensing instrument. With reference to FIG. 8, the wireless detector (58) can be mounted anywhere, and the needle points to a value on the scale on the front panel (12) corresponding to the value of the sensed environmental parameter outside the wireless detector.

The DC power supply (16) is attached to the rear face of the casing (11) and connected to the drive unit (40) and the detecting and driving circuit (50) to provide them DC power. The DC power supply (16) can use a battery set.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electronic environment sensing instrument having an analog indicator, comprising:
   a casing having a front panel with
      a front face having at least one scale with an associated indicating needle;
      a rear face; and
      a central through hole;
   an electronic driving indicator assembly attached to the rear face of the front panel for imparting movement to the indicating needle and having
      a sensor for sensing and measuring an environmental parameter outside the casing;
      a detecting and driving circuit for converting a sensed environmental parameter to a voltage;
      an electronic drive unit receiving the voltage; and
      a gear assembly operated by the drive unit, wherein the drive unit is connected between the gear assembly and the detecting and driving circuit; wherein the needle is connected to the gear assembly via the central hole; and
   a first DC power supply attached to the rear face of the casing and connected to the drive unit and the detecting and driving circuit.

2. The electronic environment sensing instrument as claimed in claim 1, wherein the sensor is a temperature sensor.

3. The electronic environment sensing instrument as claimed in claim 1, wherein the sensor is a humidity sensor.

4. The electronic environment sensing instrument as claimed, in claim 1, wherein the first DC power supply is a battery set.

5. The electronic environment sensing instrument as claimed in claim 1, wherein the gear assembly comprises:
   a main gear connected to the drive unit;
   a decelerating gear set having multiple gear elements, each of which mainly has a smaller drive gear and a larger driven gear, wherein the gear elements sequentially engage each other, and a first gear element engages the main gear;
   a linking gear engaging a last gear element of the decelerating gear set and having a center axis; and
   a connector connected coaxially to the linking gear, passing through the central through hole in the front panel and holding the needle.

6. The electronic environment sensing instrument as claimed in claim 5, wherein the drive unit comprises:
   a clockwise winding and a counterclockwise winding mounted on the rear face of the front panel perpendicular to each another, each winding having a U-shaped yoke with an opening and two opposite arms and a coil wound around one arm of the yoke, wherein the coils are connected to the detecting and driving circuit, and the two openings are perpendicular to each another; and a ring magnet mounted in the two openings and connected to the main gear.

7. The electronic environment sensing instrument as claimed in claim 6, wherein the gear assembly further comprises
   a board mounted on the rear face of the front panel, corresponding to the central through hole in the front panel and having
      an upper face;
      a magnet recess formed on the upper face of the board to hold the ring magnet;
      a pin hole formed through the board and corresponding to the central through hole in the front panel, wherein one of the gear elements is mounted in the pin hole and rotates on the board; and
      at least one drive gear hole defined on the board, through which a drive gear extends to drive an adjacent driven gear; and
   multiple posts formed on the rear face of the front panel on which the board is mounted to form a gap between the rear face and the board.

8. The electronic environment sensing instrument as claimed in claim 7, wherein the smaller drive gear on the last gear element in the decelerating gear extends through a corresponding drive gear hole to engage a linking gear mounted under the board.

9. The electronic environment sensing instrument as claimed in claim 8, further comprising a case attached to the rear face of the front panel to hold the electronic sensing and driving assembly.

10. The electronic environment sensing instrument as claimed in claim 6, wherein the detecting and driving circuit comprises:

a signal converter for receiving a sensed parameter from the sensor and converting the sensed parameter to an electronic signal;

a microprocessor having at least one input and at least one output, one input being connected to the signal converter, wherein the microprocessor is adapted to calculate a value for a sensed environmental parameter from the converted signal and generate a control signal; and a motor driver connected to an output of the microprocessor and adapted to receive the control signal from the microprocessor and send a corresponding voltage to the appropriate winding to rotate the needle to the correct value on the scale on the front panel.

11. The electronic environment sensing instrument as claimed in claim 10, wherein the sensor is a temperature sensor.

12. The electronic environment sensing instrument as claimed in claim 10, wherein the sensor is a humidity sensor.

13. The electronic environment sensing instrument as claimed in claim 10, wherein the signal converter is an analog to digital converter.

14. The electronic environment sensing instrument as claimed in claim 10, further comprising a status indicator connected to additional outputs of the microprocessor.

15. The electronic environment sensing instrument as claimed in claim 14, wherein the status indicator is an light emitting diode set.

16. The electronic environment sensing instrument as claimed in claim 6, wherein the sensor has a wireless transmitter and is coupled to an additional DC power supply and the detecting and driving circuit further comprises:

a wireless receiver for receiving a signal from the wireless transmitter;

a signal converter connected to the wireless receiver for converting the sensed parameter to an electronic signal;

a microprocessor having at least one input and at least one output, one input being connected to the signal converter, wherein the microprocessor is adapted to calculate a value for a sensed environmental parameter from the converted signal and generate a control signal; and a motor driver connected to an output of the microprocessor and adapted to receive the control signal from the microprocessor and send a corresponding voltage to the appropriate winding to rotate the needle to the correct value on the scale on the front panel.

17. The electronic environment sensing instrument as claimed in claim 16, wherein the sensor is a temperature sensor.

18. The electronic environment sensing instrument as claimed in claim 16, wherein the sensor is a humidity sensor.

19. The electronic environment sensing instrument as claimed in claim 16, wherein the signal converter is an analog to digital converter.

20. The electronic environment sensing instrument as claimed in claim 16, wherein the first DC power supply is a battery set and the additional DC power supply is a battery set.

21. The electronic environment sensing instrument as claimed in claim 16, further comprising a status indicator connected to additional outputs of the microprocessor.

22. The electronic environment sensing instrument as claimed in claim 21, wherein the status indicator is an light emitting diode set.

* * * * *